United States Patent [19]

Linder et al.

[11] Patent Number: 4,690,373

[45] Date of Patent: Sep. 1, 1987

[54] MAGNETIC VALVE FOR FLUID CONTROL

[75] Inventors: Ernst Linder, Mühlacker; Helmut Rembold; Max Straubel, both of Stuttgart; Walter Teegen, Waiblingen, all of Fed. Rep. of Germany

[73] Assignee: Robert Bosch GmbH, Stuttgart, Fed. Rep. of Germany

[21] Appl. No.: 779,723

[22] Filed: Sep. 24, 1985

[30] Foreign Application Priority Data

Nov. 23, 1984 [DE] Fed. Rep. of Germany ....... 3442750

[51] Int. Cl.[4] ............................................... F16K 31/06

[52] U.S. Cl. .......................... 251/129.02; 251/129.16; 239/585

[58] Field of Search ...................... 251/129.16, 129.18, 251/129.02, 129.08; 239/585

[56] References Cited

U.S. PATENT DOCUMENTS

| | | | |
|---|---|---|---|
| 1,175,864 | 3/1916 | Gold | 251/129.02 |
| 3,325,139 | 6/1967 | Diener et al. | 251/129.02 |
| 3,529,620 | 9/1970 | Leiber | 251/129.18 X |
| 3,661,130 | 5/1972 | Eheim . | |
| 4,251,052 | 2/1981 | Hertfelder et al. | 251/129.02 |
| 4,475,690 | 10/1984 | Hascher-Reichl et al. . | |

FOREIGN PATENT DOCUMENTS

| | | | |
|---|---|---|---|
| 0077599 | 4/1983 | European Pat. Off. | 251/129.16 |
| 46284 | 3/1983 | Japan | 251/129.08 |

*Primary Examiner*—Arnold Rosenthal

*Attorney, Agent, or Firm*—Edwin E. Greigg

[57] ABSTRACT

The magnetic valve for fluid control in a fuel injection nozzle includes a valve housing having a magnetic coil mounted on a core of ferromagnetic material and an armature, which is connected to a valve closing element cooperating with a fixed valve seat. After the excitation of the magnetic coil is interrupted, the valve closing element is moved toward a stop tappet by the force of a restoring spring and by the fluid pressure engaging the valve closing element. The stop tappet is supported such that it is displaceable in the opening direction of the valve closing element, counter to the force of a second spring. As a result, a large flow cross section is available for the fluid between the valve seat and a closing body of the valve closing element and a rapid pressure drop is made possible. If the fluid pressure drops below a predetermined level, then the additional spring displaces the stop tappet and hence the armature and the valve closing element into a position in which the flow cross section and the air gaps provided at the armature are decreased, thereby assuring rapid closure of the magnetic valve when the magnetic coil is excited.

6 Claims, 3 Drawing Figures

MAGNETIC VALVE FOR FLUID CONTROL

BACKGROUND OF THE INVENTION

The invention is directed to improvements in magnetic valves for fluid control in fuel injection nozzles.

A magnetic valve is already known in which the movement of the valve closing part in the opening direction is limited by a fixed stop. In this valve, during the opening stroke of the valve closing element, which is joined to the armature, there is a steep drop in the pressure of the fluid that is to be controlled, nonetheless a constant flow cross section is still available between the valve closing element and the valve seat after the valve closing element has contacted the stop whereby the fluid pressure drop takes place in a delayed manner. A more rapid pressure drop would be attainable if the flow cross section between the valve closing element and the valve seat when the valve was opened were it enlarged, but this enlargement would produce the disadvantage of a larger air gap between the core and the armature of the magnetic valve, which gap would improperly prolong the closing time of the magnetic valve.

OBJECT AND SUMMARY OF THE INVENTION

It is a principal object of the magnetic valve according to the invention to provide the advantage over the prior art that fast switching times of the magnetic valve are retained but yet, the desirable rapid pressure drop in the fluid that is to be controlled immediately after the opening of the magnetic valve is assured as well.

It is another object of the invention, and particularly advantageous, to provide a compression spring as the stop, so that as the fluid pressure drops when the magnetic valve is opened, the armature and core approach one another more closely, providing a rapid closure of the magnetic valve is effected when the magnetic coil is excited.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
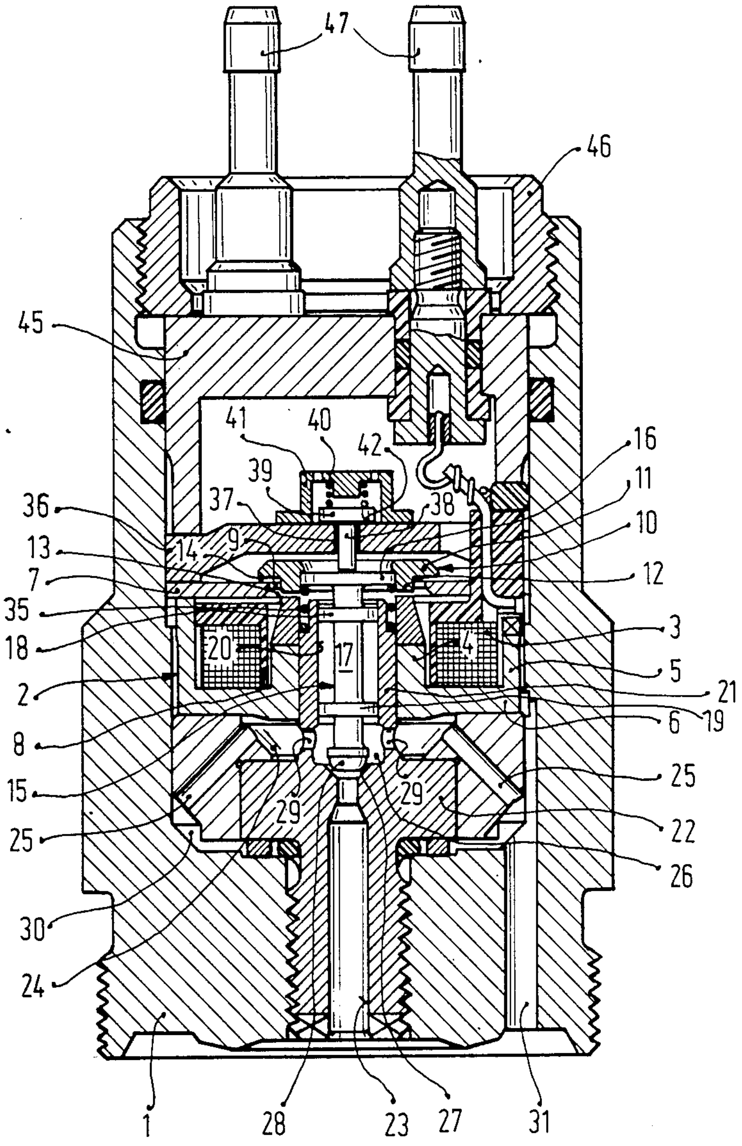
FIG. 1 shows a first exemplary embodiment of a magnetic valve according to the invention.

In the magnetic valve shown in FIG. 1, a valve housing 1 is shown. Inside the valve 1 is a core 2 of ferromagnetic material, which carries a magnetic coil 3. The core 2 has an inner cylinder 4 and an outer cylinder 5, which are arranged concentrically with one another and surround the magnetic coil 3. The inner cylinder 4 and outer cylinder 5 are joined in a magnetically conductive manner by a yoke 6. Remote from the yoke 6, a magnetically conductive circular plate 7 protrudes from the outer cylinder 5 toward the inner cylinder 4. The magnetic coil 3 is supported by a coil body 8. The magnetic circuit that is interrupted between the inner cylinder 4 and the circular plate 7 is bridged by an armature 10. The armature 10 has a disk-shaped portion 11, which merges with a hollow-centered, cylindrical protrusion 12. The protrusion 12 faces the end face of the inner cylinder 4 and, oriented toward the inner cylinder 4, passes through and engages an opening 9 in the plate 7. Between the protrusion 12 and the inner cylinder 4, there is a first air gap 13.

Remote from the inner cylinder 4, the disk-shaped portion 11 of the armature 10 projects outward beyond the plate 7 and with it forms a second air gap 14. A valve closing element 15 of nonmagnetic material, which has a disk-shaped armature head 16 and a tappet 17, is pressed with the armature head 16 into the disk-shaped portion 11 of the armature 10. Two guide sections 18, 19 guide the valve closing element 15 in a cylindrical bore 20 of a guide bushing 21. The guide bushing 21 is part of a valve seat body 22, which has an inflow bore 23 located in an extension of the cylindrical bore 20 of the guide bushing 21.

The yoke 6 and the valve seat body 22 define therebetween a hollow chamber 24, leading away from which are outflow bores 25. A valve seat 27 is formed in the valve seat body 22 between the inflow bore 23 and an annular chamber 26, and a ball-shaped closing body 28 of the valve closing element 15 cooperates with the valve seat 27. Connecting bores 29 in the guide bushing 21 connect the hollow chamber 24 and the annular chamber 26 with one another. The outflow bores 25 lead via intermediate chambers 30 to a return line 31. Fluid is delivered at high pressure to the inflow bore 23 when the magnetic valve is closed, for example from the pump supply chamber of a fuel feed pump for fuel injection systems for internal combustion engines; the fluid pressure in the return line 31, meanwhile, is low. The return line 31 communicates for example with the intake side of the pump tappet of the fuel feed pump. A restoring spring 35 is supported on the guide bushing 21 and on its other end engages the armature head 16 of the valve closing element 15.

In the non-excited state of the magnetic coil 3, the restoring spring 35 lifts the valve closing element 15 from the valve seat 27 and keeps the magnetic valve in the opened position. A stop plate 36 is disposed above the armature 10 and the plate 7 in the valve housing 1. A through bore 37 is provided in the stop plate 36, being oriented toward the cylindrical bore 20 in the guide bushing 21. A stop tappet 38 which is joined to a stop head 39 of larger diameter passes through the through bore 37. The stop head 39 is located on the side of the stop plate 36 remote from the armature 10. The stop tappet 38 is slidably supported in the through bore 37. A second spring 40 is supported on the stop head 39 and rests on its other end on a spring housing 41, which is joined to the stop plate 36, for instance by screws, not shown. The second spring 40 acts upon the stop head 39 in the following manner: until a predetermined level of force acts upon the stop tappet 38, the stop head 39 rests on the face of the stop plate 36 remote from the armature 10; this face of the stop plate comprises a first stop 42.

The cup-shaped valve housing 1, in which the valve seat body 22, the core 2, the plate 7 and the stop plate 36 are disposed, also receives a cover plate 45, which rests on one end against the stop plate 36 and on the other end is engaged by a threaded ring 46, which is screwed into the valve housing 1 so as to fasten the parts 2, 7, 22, 36 and 45 within the valve housing 1. Electric current is supplied to the magnetic coil 3 via electrically conductive stop pins 47, which are disposed in the cover plate 45.

Figure 2:
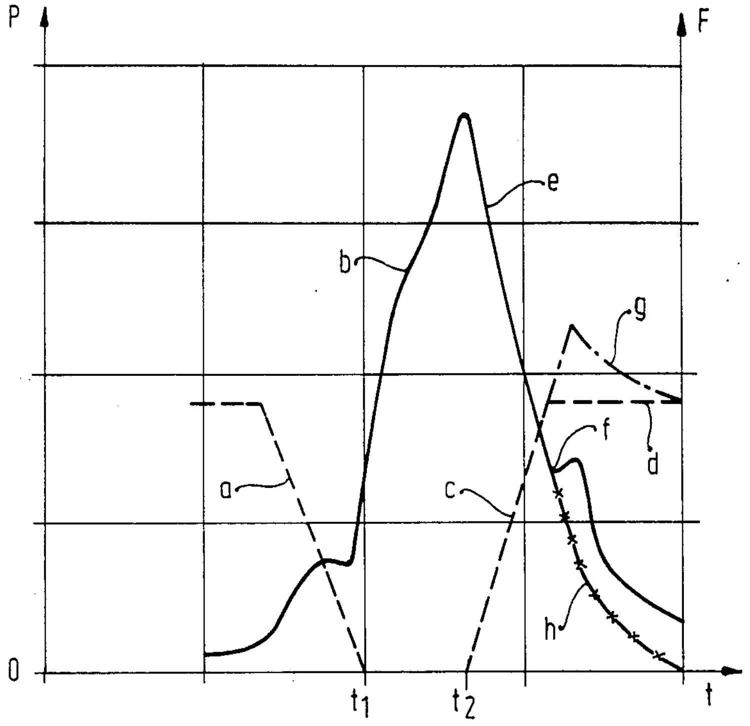
FIG. 2 is a diagram showing the course of the fluid pressure and of the valve opening cross section plotted over time.

The mode of operation of the magnetic valve according to the invention will now be described, all references being to FIG. 2. In FIG. 2, the time t is plotted on the abscissa; the fluid pressure p in the inflow bore 23 is plotted on the left ordinate and the flow cross section F between the valve seat 27 and the closing body 28 of the valve closing element 15 is plotted on the right ordinate. If the magnetic coil 3 is excited, the armature 10 is drawn toward the core 2, causing the valve closing element 15 to move toward the valve seat 27 as indicated by the broken line "a" on the left in FIG. 2; at time $t_1$ the valve closing body 28 of the valve closing element 15 rests on the valve seat. The magnetic valve is now closed, and fluid pressure can build up in the inflow bore 23 (as represented by the solid curve "b" in the figure) for instance as a result of the pump tappet supply stroke in a fuel injection pump.

If the excitation of the magnetic coil 3 is now interrupted at time $t_2$, then the closing body 28 is moved in the opening direction toward the stop tappet 38, by the force of the restoring spring 35 on the one hand and by the force of the high fluid pressure engaging the closing body 28 on the other. As a result of these forces, a flow cross section for the fluid is brought about between the valve seat 27 and the closing body 28, as represented by curve "c" shown in broken lines on the right-hand side of the diagram.

With regard to a stop tappet 38 attached to the housing, the opening movement of the valve closing element 15 would be limited by the stop tappet 38, so that when the valve closing element 15 came to rest on the stop tappet 38 the flow cross section of the valve would become constant, as indicated by the horizontal line "d" shown in broken lines. For an embodiment with a stop tappet 38 attached to the housing, there is accordingly a drop in the fluid pressure in the inflow bore 23 as represented by the solid line "e", which has a break at the instant the opening movement of the valve closing element 15 ends, that is, at the transition from line "c" to the constant flow cross section represented by the line "d". From this transition point on, the fluid pressure declines only in a delayed manner, which is undesirable.

According to the invention, the stop tappet 38 is supported such that it is displaceable counter to the force of the second spring 40, so that after the excitation of the magnetic coil 3 is interrupted the sum of the forces exerted by the restoring spring 35 and the fluid pressure exerted on the closing body 38 is sufficient to overcome the opposing force of the second spring 40. Thus, once the valve closing element 15 contacts the stop tappet 38, it displaces the stop tappet 38 in the opening direction of the valve closing element 15, causing the stop head 39 to lift from the stop plate 36 so as to open a still larger flow cross section between the valve seat 27 and the closing body 28. This state is indicated by the dot-dash line "g".

When the fluid pressure force on the closing body 28 drops, the second spring 40 displaces the stop tappet 38, and hence the valve closing element 15 as well, in the direction of the valve seat 27, until the stop head 39, below a predetermined pressure, comes to rest on the stop plate 36 and a constant flow cross section, represented by the line "d", is established between the valve seat 27 and the closing body 28. As a result of the larger flow cross section, corresponding to the dot-dash line "g", that is available between the valve seat 27 and the closing body 28, a rapid drop in the pressure of the fluid takes place in a desired manner across the valve seat 27; this phenomena is represented in the figure by the line "h" drawn in x's and dashes. When the stop head 39 is resting on the stop plate 36, the valve closing element 15 and the armature 10 are kept in a position in which the air gaps 13 and 14 are so small that the next time the magnetic coil 3 is excited, a rapid closure of the magnetic valve is assured.

Figure 3:
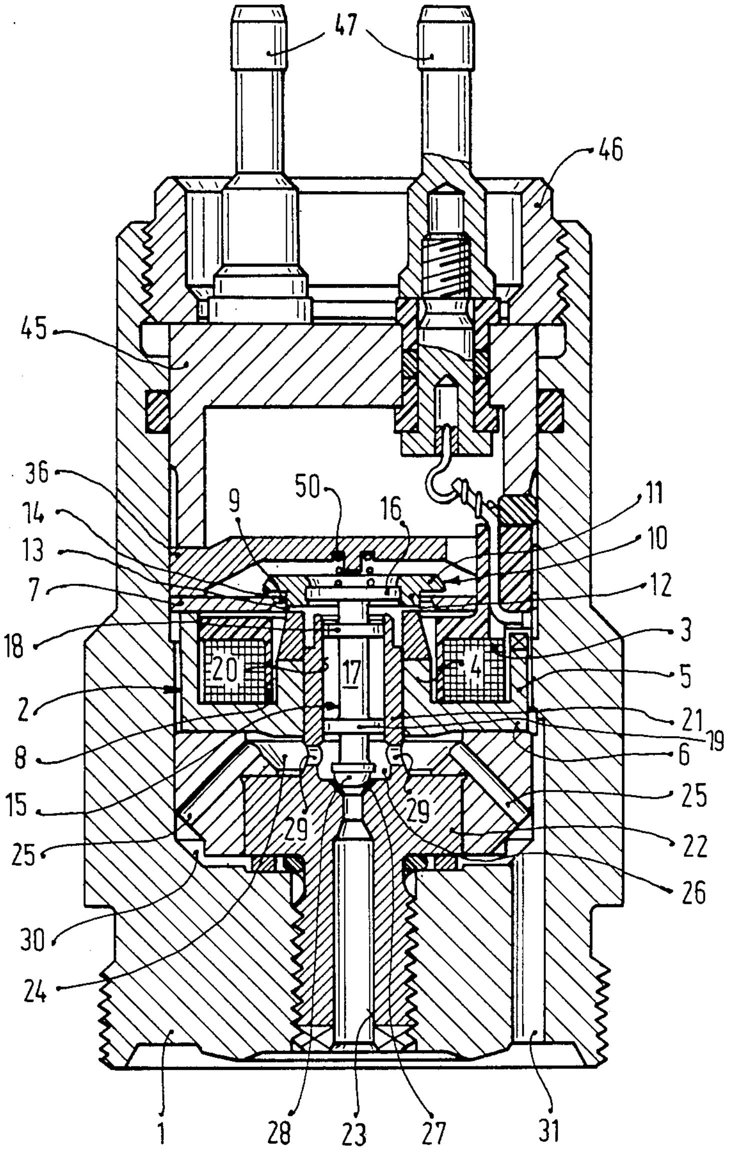
FIG. 3 shows a second exemplary embodiment of a magnetic valve according to the invention.

In the second exemplary embodiment of the magnetic valve according to the invention, shown in FIG. 3, elements remaining the same as and functioning like those of the magnetic valve of FIG. 1 are identified by the same reference numerals. In contrast to the magnetic valve of FIG. 1, no restoring spring 35 is needed in the magnetic valve of FIG. 3, and the stop tappet 38 along with the stop head 39 and second spring 40 are omitted. In contrast to the magnetic valve of FIG. 1, in the magnetic valve of FIG. 3 a compression spring 50 is disposed between the armature head 16 of the valve closing element 15 and the stop plate 36. The compression spring 50 displaces the armature 10 and the valve closing element 15 in the direction of the valve seat 27 and acts as a resilient stop. If the excitation of the magnetic coil 3 is interrupted, then the force exerted on the closing body 28 by the fluid pressure in the inflow bore 23 displaces the valve closing element 15 and the armature 10 counter to the force of the compression spring 50, so that a large flow cross section, corresponding to the line "g" in FIG. 2, is opened up for the fluid between the valve seat 27 and the closing body 28. As a result, a more rapid drop in the pressure of the fluid is possible. As the fluid pressure drops, the force of the compression spring 50 displaces the armature 10 and the valve closing element 15 moves in the direction of the valve seat 27. Therefore, not only is the flow cross section between the valve seat 27 and the closing body 38 reduced, but the air gaps 13 and 14 as well are reduced, and thus when the magnetic coil 3 is next excited, a rapid closure of the magnetic valve takes place in the desired manner.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic valve for fluid control comprising a valve housing, a magnetic coil mounted on a core of ferromagnetic material disposed in said housing and provided with an armature that actuates a valve closing element arranged to cooperate with a fixed valve seat, the armature being arranged to press the valve closing element against the valve seat counter to an opposing force of fluid flow during an excited state of said magnetic coil, said valve closing element being lifted in an opening direction from the valve seat by said opposing force of fluid flow during an unexcited state of said magnetic coil and limited in a lifted direction by a yieldable stop means spaced axially therefrom, the stop means being arranged to yield in the opening direction of the valve closing element, and the valve closing element is adapted to lift a variable distance off the valve seat thereby increasing a free flow cross section at the valve seat as a function of fluid pressure applied by said opposing force of fluid flow acting thereon.

2. A magnetic valve as defined by claim 1, which includes at least one spring means arranged to counter displacement of said stop means in the opening direction of the valve closing element.

3. A magnetic valve as defined by claim 2, in which said magnetic valve includes an auxiliary stop from which the stop means can be lifted, above a predetermined pressure level of said fluid pressure.

4. A magnetic valve as defined by claim 1, further wherein said stop means comprises a compression spring.

5. A magnetic valve as defined by claim 3, further wherein said auxiliary stop comprises a plate.

6. A magnetic valve as defined by claim 3, further wherein said stop means comprises a stop tappet.

* * * * *